United States Patent [19]

DePoorter

[11] 4,325,177

[45] Apr. 20, 1982

[54] MODULAR ART WALL SYSTEMS

[76] Inventor: Lieven L. DePoorter, 6031 SW. 82 Ave., Miami, Fla. 33143

[21] Appl. No.: 4,767

[22] Filed: Jan. 19, 1979

[51] Int. Cl.$^3$ .............................................. B23P 25/00

[52] U.S. Cl. .......................................... 29/458; 29/460; 29/469.5; 29/527.5; 29/530; 428/159; 428/167; 428/169; 428/173

[58] Field of Search ................. 428/38, 173, 167, 313, 428/121, 71, 13, 14, 67, 927, 939, 164, 75, 582, 583, 584, 600, 614, 76, 173, 159, 160, 161, 158, 169, 643, 644, 645, 646, 647, 648, 315, 310; 427/275, 287, 376.8, 290, 292; 156/293, 214, 227, 216, 59, 196, 202, 204, 212, 213, 219; 29/527.4, DIG. 30, 458, 469.5, 527.5, 530, 460, 525; 52/316, 314

[56] References Cited

U.S. PATENT DOCUMENTS

| | | | |
|---|---|---|---|
| 8,964 | 11/1879 | Bodenstein | 29/DIG. 30 |
| 281,928 | 7/1883 | Rothschild | 29/530 |
| 369,147 | 8/1887 | Wood | 428/927 |
| 372,291 | 4/1887 | Baynes | 428/173 |
| 374,559 | 12/1887 | Rudolph | 427/275 |
| 406,668 | 7/1889 | Sagendorph | 52/314 |
| 734,066 | 7/1903 | Heintz | 428/614 |
| 1,373,430 | 4/1921 | Humphrey | 29/DIG. 30 |
| 1,586,927 | 6/1926 | Wilkinson et al. | 428/939 |
| 1,651,792 | 12/1927 | Wernig | 428/614 |
| 1,703,746 | 2/1929 | O'Neill | 427/275 |
| 2,331,796 | 10/1943 | Odell | 52/314 |
| 2,445,858 | 7/1948 | Mitchell et al. | 428/939 |
| 2,837,779 | 6/1958 | Jacobs | 428/76 |
| 2,941,282 | 6/1960 | Fromson | 428/614 |
| 3,043,730 | 7/1962 | Adie | 428/164 |
| 3,672,926 | 6/1972 | Ramey | 427/275 |
| 3,715,256 | 2/1973 | Truesdell et al. | 156/293 |
| 3,771,213 | 11/1973 | Peraro | 52/144 |
| 3,842,488 | 10/1974 | Mitchell | 29/DIG. 30 |
| 3,876,483 | 4/1975 | Holt | 428/38 |
| 3,922,414 | 11/1975 | Oshima et al. | 428/121 |
| 3,955,261 | 5/1976 | Appel et al. | 428/927 |
| 4,009,309 | 2/1977 | Holt | 428/173 |
| 4,110,393 | 8/1978 | Trame | 428/38 |

FOREIGN PATENT DOCUMENTS

| | | | |
|---|---|---|---|
| 470364 | 8/1946 | Canada | 29/527.4 |
| 2704475 | 8/1978 | Fed. Rep. of Germany | 428/313 |
| 22386 | of 1908 | United Kingdom | 428/614 |

*Primary Examiner*—Stanley S. Silverman
*Attorney, Agent, or Firm*—Meredith P. Sparks

[57] ABSTRACT

A decorative wall panel for use individually as an accent piece, or for mounting in multiples to a wall or the like, to define a decorative wall area such as, for example, around an open fireplace. Each panel is formed of a suitable sheet metal material, such as copper, including a main panel area, bounded by peripheral turned-in edge portions to nest a support block. The main panel area is randomly subdivided into smaller, variously sized and configurated panel portions by grooves formed therein which are filled with a suitable material such as solder; and various individual panel portions are provided with design characterists in relief while various colorations may be selectively applied to any of the panel portions.

2 Claims, 4 Drawing Figures

MODULAR ART WALL SYSTEMS

BACKGROUND OF THE INVENTION

The present invention pertains to a decorative panel formed of a suitable sheet material, such as copper, including a main panel portion with peripheral inwardly turned edge flanges to nest a block of a suitable material such as styrofoam, for example. The main panel portion is grooved to define a plurality of randomly configurated panel portions which are selectively provided with various patterns in relief or left to present a natural outer surface, and including various colorations on selected panel portions. The grooves are filled with a suitable material such as solder, to provide the effect of a plurality of separate panel portions which are secured together.

Therefore, one of the principal objects of the present invention is to provide a decorative panel formed of a suitable malleable sheet material, such as copper, which is subdivided into randomly sized and shaped panel portions which are in turn randomly provided with patterns in relief, with various colorations on their outer surfaces, or left in a natural state.

A further object of the present invention is to provide a main panel portion with turned-in peripheral flanges to nest a support block of a suitable synthetic foam material such as styrofoam.

Yet another object of the instant invention is to subdivide the panel into the randomly sized and shaped panel portions by means of solder filled grooves, formed in the panel.

DETAILED DESCRIPTION OF A PREFERRED EMBODIMENT

Figure 1:
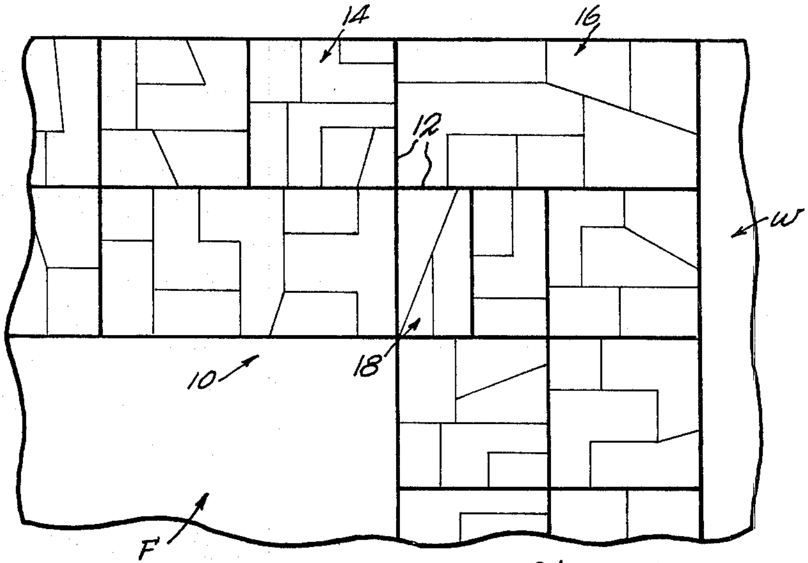
FIG. 1 is a plan view of a plurality of various sized panels of the present invention mounted to the surface of a wall.

With reference to the drawings in which like reference characters designate like or corresponding parts throughout the various views and with particular reference to FIG. 1, a plurality of panels 10 of the present invention are illustrated, secured to a wall W, for example, to accent a fireplace opening F. The heavy lines 12 designate the outlines of the various individual panels, three complementarily sized panels being illustrated respectively at 14, 16 and 18, by way of example.

Figure 2:
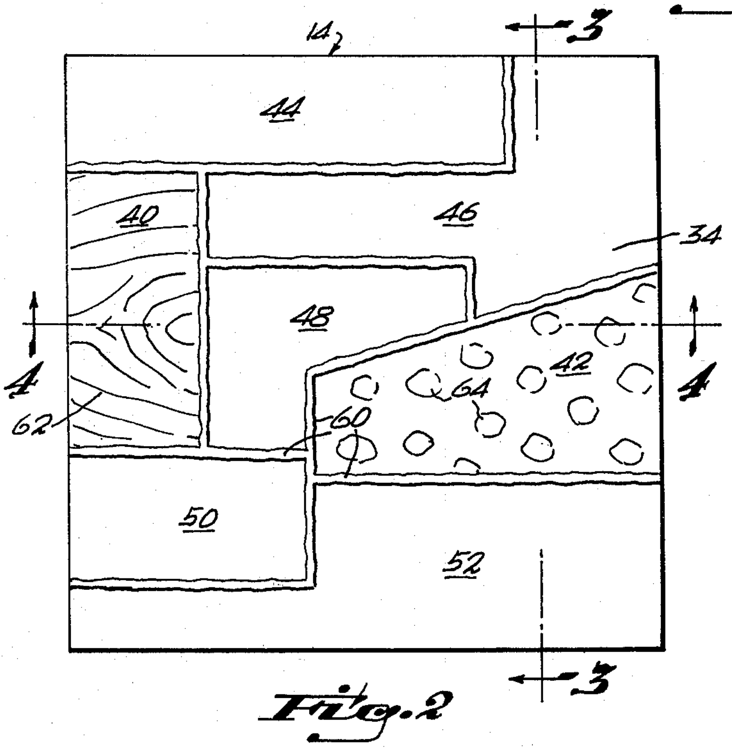
FIG. 2 is an enlarged plan view of one of the panels.
Figure 3:
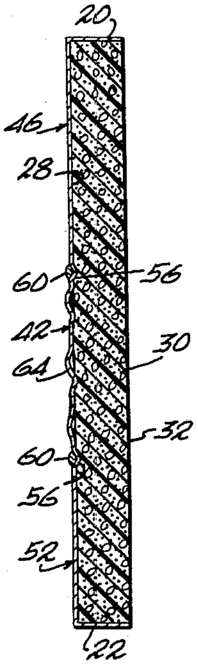
FIG. 3 is a cross sectional view taken along line 3—3 of FIG. 2.
Figure 4:
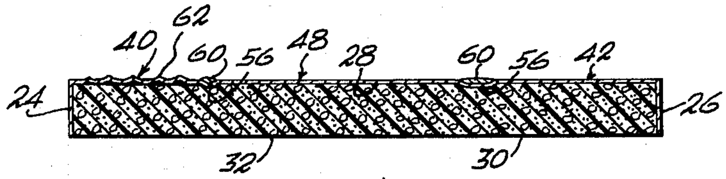
FIG. 4 is a cross sectional view taken along line 4—4 of FIG. 2.

Panel 14, FIG. 2, is formed of a suitable, relatively thin sheet metal such as copper, with two pairs of inwardly bent side flanges 20, 22 and 24, 26, FIGS. 3 and 4, to define an inner cavity 28, filled with a block 30 of a suitable synthetic foam material such as styrofoam. Block 30 is secured in the cavity 28 by a suitable adhesive material, and the back side 32 of the block may be coated with an adhesive material to secure the panel 14 to wall W.

The face 34 of panel 14 of FIG. 2, is randomly subdivided into a plurality of panel portions 40, 42, 44, 46, 48, 50, and 52 which, as illustrated in FIGS. 3 and 4, are defined by grooves such as 56, formed in the face 36. The grooves such as 56, are filled with solder 60, providing the illusion of separately connected panel portions.

Panel portions 40 and 42 are provided with patterns 62 and 64 in relief, pattern 62 being of a wood grain nature and 64 being of rounded projections. The patterns illustrated are by way of example only, and may be formed by laying the panel face down on suitable objects provided with the desired patterns which may be raised and/or depressed, and applying suitable forces to the back side of the panel facets to deform the sheet metal to the design patterns.

The panel portions 40 through 52 may be selectively provided with various colorations to provide a weathered look, left in a natural state, may be polished, stained or altered in any convenient manner to achieve a desired effect. A panel installation, as fragmentarily illustrated in FIG. 1, provides a very rich distinctive appearance, particularly when the panels are formed of sheet copper. A wide range of randomly sized and shaped panel portions may be provided on variously sized panels. Although the panels illustrated in the drawings and above described are generally rectangular, it should be understood that a variety of panel configurations may be provided without departing from the true spirit of the inventions as defined in the appended claims.

The following procedures are used in the preparation of the modular art wall blocks of this invention.

A sheet of copper about 0.010" or 0.005" thick and 14"×14" square is placed in a press which will fold down one inch on four sides at 90°, producing what looks like a shallow pan, the bottom of which is square foot in size with 1" sides.

The artistic and textured appearance is created on the outside bottom portion with the use of a molded die and stamping machine which will leave the imprint of one particular pattern in bold relief, and at the same time make a channel or shallow groove approximately 1/16" deep which divides each area of relief. A bronze or brazing rod is heated with a torch so that the melt flows into the channel or shallow groove, and lays flush with the surface. On cooling the melt hardens and at the same time the melt makes a permanent bond with the copper.

The impression can also be made by placing the copper sheet over a brick, chicken wire, or other creative types of textures and struck with a rubber mallet to obtain an impression which transfers through the copper.

Colors on copper result by heating the surface with a torch. Shading is produced by applying chemicals such as potassium hydroxide or hydrochloric acid with a brush and then wiping off the excess. The surface is then washed as necessary to stop chemical action. Staining results from use of chemicals which are allowed to set and etch. Patina can be obtained by lightly brushing on a mixture of sodium chloride and white vinegar, or ammonium chloride.

The final finish is sealed by treating with a transparent plastic film.

The decorative copper sheet with turned-in peripheral flanges is nested in a support block of a suitable synthetic foam material such as styrofoam. The plastic foam core also has insulating characteristics, and a resistance to the transmission of water vapor and the absorption of moisture. Polystyrene foam has good compressive, flectual and sheer strengths. The compressive strength of polystyrene increases with the density of the foam. The preferred polystyrene foam for use in this invention is that known in the trade as "Styrofoam E.P.S." which has a closed cell structure.

The decorative copper sheet is nested in the styrofoam support and secured to the styrofoam with an adhesive means. A solvent contained adhesive is preferred for this purpose.

The resultant unit provides a structural module which can be shipped as single pieces which can be quickly and easily assembled with a minimum of time and labor.

I claim:

1. A process for the formation of a decorative wall panel comprising the steps of:

a. providing a relatively thin sheet of a suitable malleable metal material, of a predetermined size and shape, and folding peripheral edge portions thereof inwardly at approximately 90 degrees to a main face panel thereof to generally define a shallow pan configuration;

b. defining a plurality of randomly sized and configurated panel portions in said main face panel by impressed formation of a plurality of grooves therein;

c. forming a characteristic design in bold relief in at least one of said panel portions;

d. flowing a melt of solder into said grooves to a predetermined depth, and allowing said solder to harden and form a permanent bond with said sheet;

e. creating various artistic designs in randomly selected said panel portions as desired;

f. nesting a support block of an appropriate size, and formed of a suitable plastic foam material, within a cavity defined by said shallow pan.

2. The process of claim 1 wherein said malleable material comprises a copper sheet.

* * * * *